United States Patent
Gillies et al.

(10) Patent No.: US 6,834,383 B2
(45) Date of Patent: Dec. 21, 2004

(54) METHOD FOR BINARY-LEVEL BRANCH REVERSAL ON COMPUTER ARCHITECTURES SUPPORTING PREDICATED EXECUTION

(75) Inventors: David Mitford Gillies, Bellevue, WA (US); Ronnie Ira Chaiken, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 09/994,258

(22) Filed: Nov. 26, 2001

(65) Prior Publication Data

US 2003/0101335 A1 May 29, 2003

(51) Int. Cl.[7] ............................................... G06F 9/44
(52) U.S. Cl. ..................... 717/151; 712/226; 712/234; 717/159
(58) Field of Search ................................ 712/226, 234; 717/151, 159

(56) References Cited

U.S. PATENT DOCUMENTS

| | | | |
|---|---|---|---|
| 5,937,195 A | 8/1999 | Ju et al. ..................... | 717/156 |
| 6,446,258 B1 * | 9/2002 | McKinsey et al. .......... | 717/161 |
| 6,591,414 B2 * | 7/2003 | Hibi et al. ................... | 717/151 |

OTHER PUBLICATIONS

On Predicated Execution, HPL-91-58, May 1991, Joseph C.H. Park, Mike Schlansker, pp. 1-25.
Global Predicate Analysis and its Application to Register Allocation, IEEE 1996, 1072-4451/96, David M. Gillies, Dz-ching Roy Ju, Richard Johnson, and Michael Schlansker, pp. 114-125.
Swizzle barrier optimizations for orthogonal persistence in Java, presented at the Third International workshop on Persistence and Java, Aug. 17, 1998, pp. 1-14.
Static Single Assignment Form for Machine Code, Sigplan '99 (PLDI) 5/99, 1999 ACM 1-58113-083-X/99/0004, Allen Leung an Lal George, pp. 204-214.
Dynamic Optimization Infrastructure and Algorithms for IA-64, Kim Michelle Hazelwood, Theses presented to North Carolina State University, Master of Science, pp. 1-98.
Accurate and Efficient Predicate Analysis with Binary Decision Diagrams, IEEE 2000, 0-7695-0924, John W. Sias, Wen-mei W. Hwu and David I. August, pp. 112-123.
IA64 Software Conventions and Runtime Architecture, Document No. 245358-002, Sep. 2000, pp 11-1 to 11-18, See websitedeveloper.intelcom.

* cited by examiner

Primary Examiner—Kenneth S. Kim
(74) Attorney, Agent, or Firm—Ryan T. Grace; Merchant & Gould (57) ABSTRACT

Described is a method that identifies a predicate expression representing conditions in predicated assembly language instructions that determine a direction of a conditional branch instruction. The predicate expression is employed to enable a transformation to be made that causes the conditional branch instruction to trigger, or execute, when an opposite condition is true. A method is directed to producing a binary-level conditional branch reversal within a binary program on a computer architecture that supports a predicated execution. The method includes obtaining a predicate expression representing a condition that influences a direction of program flow of the binary-level conditional branch to be reversed, determining a binary-level transformation that causes the binary-level conditional branch to be triggered when an opposite condition is true, and modifying the binary-level conditional branch with the determined binary-level transformation, wherein the binary-level conditional branch is reversed.

12 Claims, 9 Drawing Sheets

METHOD FOR BINARY-LEVEL BRANCH REVERSAL ON COMPUTER ARCHITECTURES SUPPORTING PREDICATED EXECUTION

FIELD OF THE INVENTION

The present invention relates generally to computer-executable software, and more particularly to optimizing binary-level instructions.

BACKGROUND OF THE INVENTION

Today's computer programming languages support conditional branch instructions such as "if-then-else," "while loops," and the like. For computer program optimization, compression, testing, or other purposes, it may be beneficial to reorder code instructions to move instructions that are more likely to be executed together in the run of the program, closer together. The reordering of instructions can sometimes be facilitated by conditional branch reversals. A conditional branch reversal is an optimization technique that reverses the order of code instructions following a conditional branch instruction to improve program execution and to make more effective use of instruction cache.

Several computer architectures support a process of converting conditional branches in a program in order to utilize predicated execution at the binary code level. The process implements conditional branches in the binary code with comparison instructions that set a predicate or binary truth-value. Instructions that are control dependent on the branch are converted to predicated instructions dependent on the value of the corresponding predicate. Generalized predication provides the ability to determine whether or not to allow (i.e., guard) the execution of virtually any instruction with a runtime condition. However, guarding predicates create a barrier to branch-reversal optimizations that has no equivalent in source-code optimizations.

Additionally, branch reversals are difficult at the binary level in computer architectures that support the use of control speculative loading of instructions. A speculative load allows an instruction to execute before the processor knows if it is necessary. Typically, a special hardware bit exists that allows control speculation to proceed without causing unnecessary page faults or other exceptions. However, if a speculative load causes an exception, or faults, the exception is not handled until it's known that the load was actually necessary. Instead, the hardware tags the invalid results with the special hardware bit. The special hardware bit is propagated to all of the uses of the load. The result is that predicates may no longer reflect the correct truth-values. Thus, control speculative loading of instructions creates yet another hurdle to implement branch reversals at the binary level.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed to a method of reversing branches at the binary level on computer architectures that support predicated execution. Briefly stated, described is a method that identifies a predicate expression representing conditions in predicated assembly language instructions that determine a direction of a conditional branch instruction. The predicate expression is employed to enable a transformation to be made that causes the conditional branch instruction to trigger, or execute, when an opposite condition is true.

In accordance with one aspect of the present invention, a computer-implemented method is directed to producing a binary-level conditional branch reversal within a binary program on a computer architecture that supports a predicated execution. The method includes obtaining a predicate expression representing a condition that influences a direction of program flow of the binary-level conditional branch to be reversed, determining a binary-level transformation that causes the binary-level conditional branch to be triggered when an opposite condition is true, and modifying the binary-level conditional branch with the determined binary-level transformation, wherein the binary-level conditional branch is reversed.

In another aspect of the present invention, the above-described method further includes obtaining the predicate expression by uniquely identifying predicates that influence the direction of program flow of the binary-level conditional branch to be reversed, deducing relationships between the uniquely identified predicates, and based on the relationships between the uniquely identified predicates, determining at least one predicate that influences the direction of program flow of the binary-level conditional branch.

In yet another aspect of the present invention, a computer-implemented method is directed to obtaining a predicate expression that determines a guarding predicate of a binary-level conditional branch instruction within a binary program. The computer-implemented method includes uniquely identifying predicates that influence a direction of program flow of the binary-level conditional branch to be reversed, deducing relationships between the uniquely identified predicates, and based on the relationships between the uniquely identified predicates, determining at least one predicate that influences the direction of program flow of the binary-level conditional branch.

In still another aspect of the present invention, a computer-implemented method is directed to determining a binary-level transformation that causes a binary-level conditional branch within a binary program to be triggered when an opposite condition is true, comprising computing an inverse predicate expression that describes the opposite condition.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

In the following detailed description, reference is made to the accompanied drawings in which are shown specific exemplary embodiments of the invention. These embodiments are described in sufficient detail to enable those skilled in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims. Referring to the drawings, like numbers indicate like parts throughout the views.

Throughout the specification, and in the claims, the term "signal" means at least one current signal, voltage signal, electromagnetic wave signal, or data signal. The meaning of "a," "an," and "the" include plural references. The meaning of "in" includes "in" and "on."

Briefly stated, the present invention generally relates to conditional branch reversals at the binary level to improve execution speed and memory usage on computer architectures that support predicated executions. The conditions that determine the direction of a branch to be reversed are first identified. Then a transformation is made at the binary level that causes the branch to trigger when the exact opposite condition is true.

Illustrative Operating Environment

Figure 1:
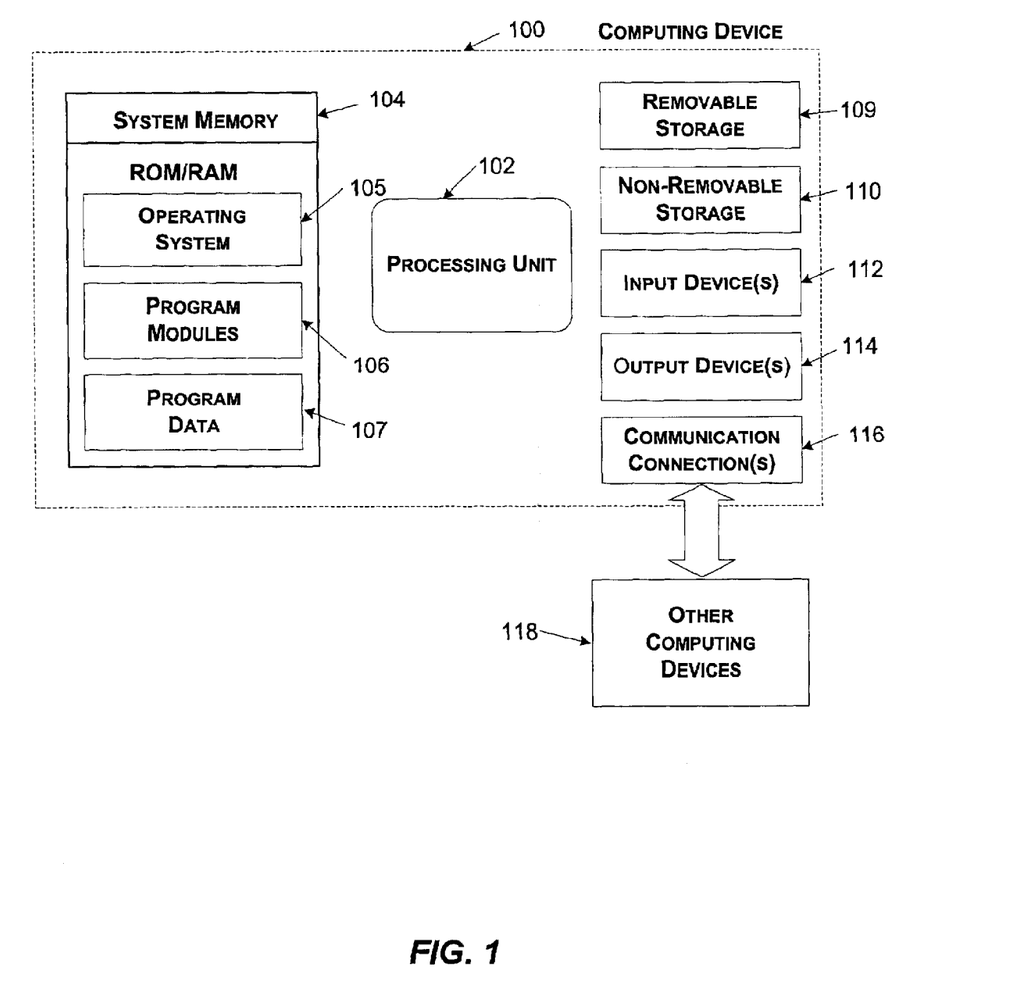
FIG. 1 shows an exemplary system for practicing the present invention.

FIG. 1 shows an exemplary system for practicing the present invention, according to one embodiment of the invention. As seen in FIG. 1, the system includes computing device 100. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Components of system memory 104 are discussed in more detail in conjunction with FIG. 2.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also include communications connection(s) 116 that allow the device to communicate with other computing devices 118, such as over a network. Communications connection(s) 116 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
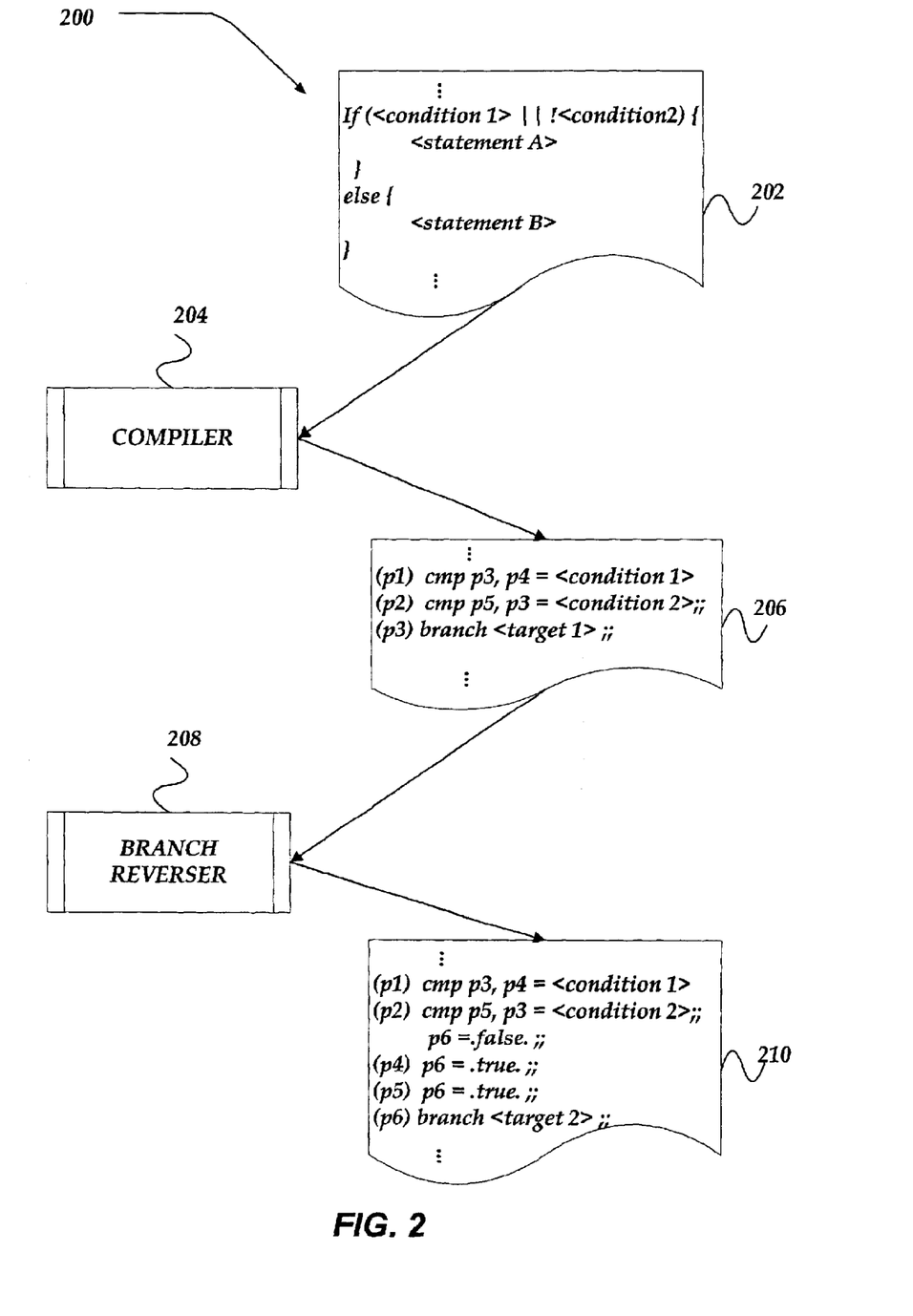
FIG. 2 shows a block diagram of one embodiment of system components employing a branch reverser to reverse branches at the binary code level on computer architectures supporting predicated executions.

FIG. 2 shows a block diagram of system components 200 employing a branch reverser 208 to reverse conditional branches at the binary code level on computer architectures supporting predicated executions, according to one embodiment of the invention. System components 200 typically are included in program modules 106 shown in FIG. 1. As shown in FIG. 2, system components 200 include source code 202, compiler 204, predicated assembly code 206, branch reverser 208, and branch reversed predicated code 210.

Source code 202 is typically written in a human-readable programming language such as FORTRAN, C++, C#, or a similar human-readable language. Source code 202 typically includes human-readable software constructs that support conditional branching of code flow during program execution. As illustrated in FIG. 2, source code 202 includes typical conditional branch instructions as a code fragment of a larger program. Shown in the code fragment within source code 202, is an if-statement that determines the truth hood of <condition 1> and <condition 2>. If <condition 1> is determined to be true or <condition 2> is determined to be false, <statement A> is executed. However, if <condition 1> is determined not to be true and <condition 2> is determined to be true, then <statement B> is executed.

Compiler 204 is a program module that translates source code 202 into machine language. Compiler 204 typically generates assembly language first and then translates the assembly language into machine language. A utility known as a "link editor" (not shown) then combines the required machine language modules into an executable program that can run in the computer, such as computing device 100 shown in FIG. 1.

Today's typical compilers, such as compiler 204, attempt to exploit the resources of computing device 100 (FIG. 1) by producing optimized assembly language output. One approach for optimizing compiler 204 output is to increase the degree of parallelism within code instructions. Computing architectures, that support predicated executions increase the degree of instruction level parallelism by allowing instructions to be converted to straight-line code guarded by predicates. Predicates are typically implemented as truth-values, represented by 1-bit Boolean registers.

Predicated assembly code 206 illustrates an example of an assembly code fragment of a binary program produced by compiler 204 with instructions guarded by predicates. As shown, the first instruction is a compare instruction that evaluates <condition 1> and sets predicates p3 and p4. Predicates p3 and p4 are typically set to opposite truth-values of each other. Similarly, the second instruction is also a compare instruction, which sets predicates p5 and p3 to opposite truth-values to each other. The final instruction is a branch, which triggers if predicate p3 is true. As illustrated in predicated assembly code 206, the instructions in the assembly code fragment are guarded by predicates (p1, p2, and p3). That is, the instructions only execute if the guarding predicate register is true. For example, the second instruction only executes if predicate p2 is true.

The inventors have determined that output of static optimization approaches such as described above with predicated assembly code 206 however, may not be well suited for the runtime behavior of a particular program such as source code 202. This may be due to a variance in the usage patterns of the program, or simply an overly aggressive static compilation decision. Additionally, runtime behaviors and branch behaviors are not usually understood at the time of initial compilation. Therefore, branch reverser 208 employs runtime data (data shown) that has been collected on the compiler output and optimally performs an analysis to determine which conditional branches should be reversed.

Branch reverser 208 is configured to receive runtime data, together with predicated assembly code 206. After analysis of the conditions that determine the directions of the conditional branches, branch reverser 208 transforms assembly code fragment 206 to produce branch reversed predicated code 210. Branch reversed predicated code 210 is discussed in detail below. Briefly, however, branch reversed predicated code 210 is configured to reverse the flow of conditional branch instructions such that more likely conditions are executed together.

Generalized Operation

Figure 5:
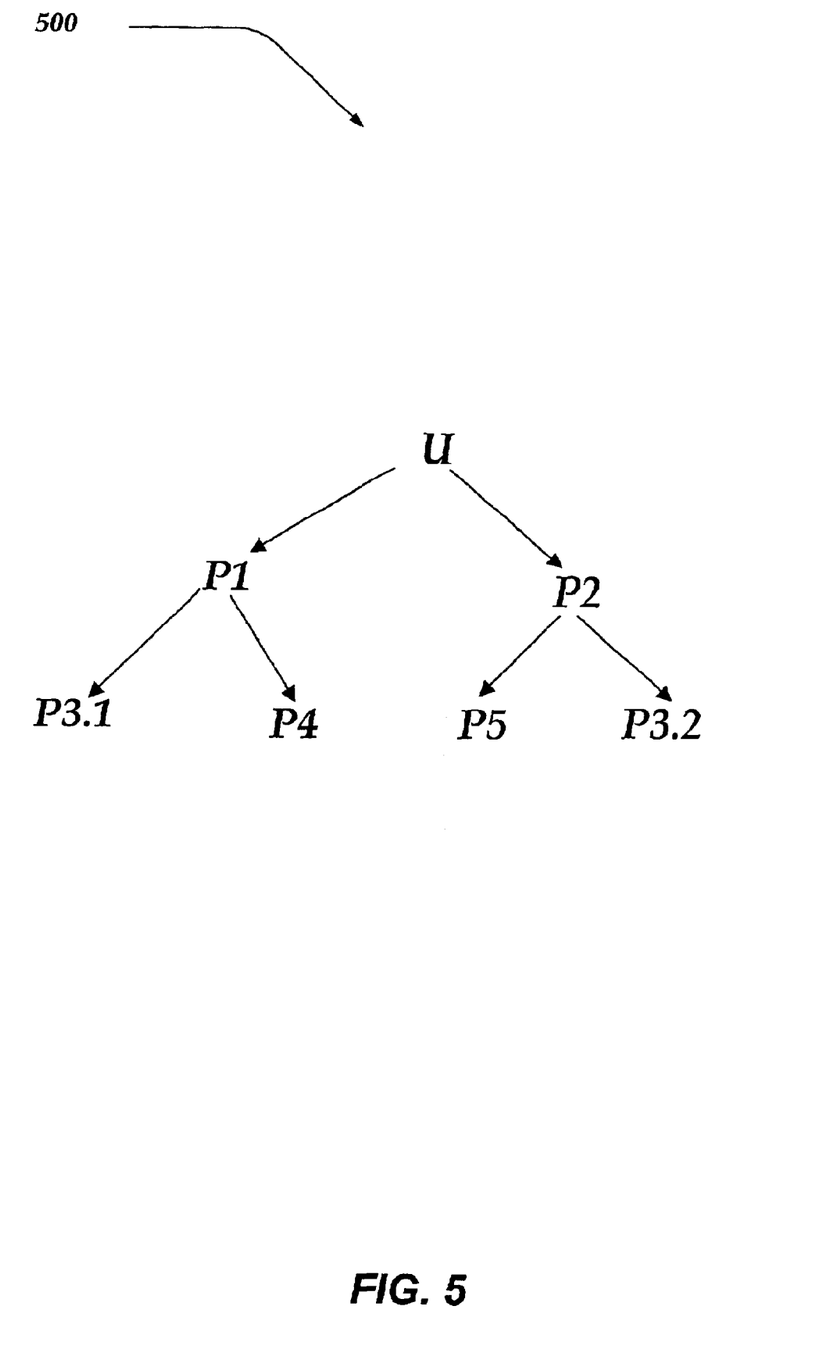
FIG. 5 is an illustration of a predicate partition graph for an intermediate representation of predicated assembly code fragment.
Figure 6:
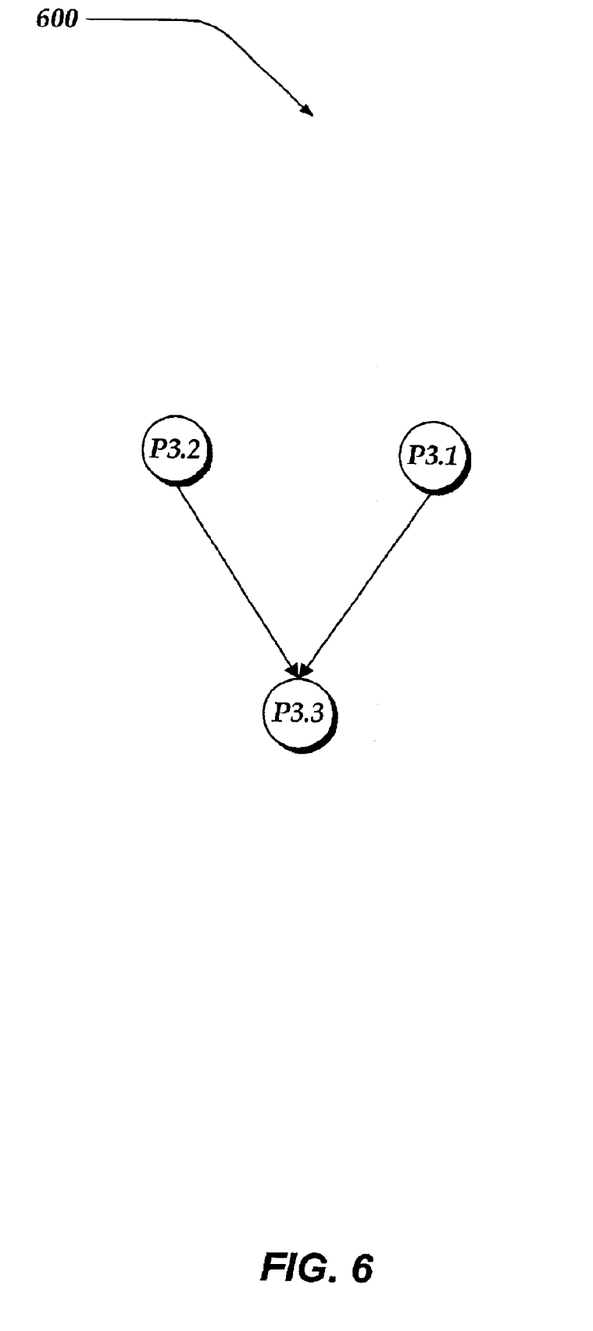
FIG. 6 shows a reaching definition relationship between predicates in an intermediate representation of the predicated assembly code fragment.

The operation of the present invention on computer architectures supporting predicated executions will now be described with respect to FIGS. 3, 4, and 7–9 which are flowcharts illustrating one embodiment of a process of the present invention. FIGS. 5 and 6 are employed to provide illustrative examples to further aid in understanding the flowcharts.

It will be understood that each block of the flowchart illustrations (FIGS. 3, 4, and 7–9), and combinations of blocks in the flowchart illustrations, can be implemented by computer program instructions. These program instructions may be provided to a processor to produce a machine, such that the instructions, which execute on the processor, create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 3:
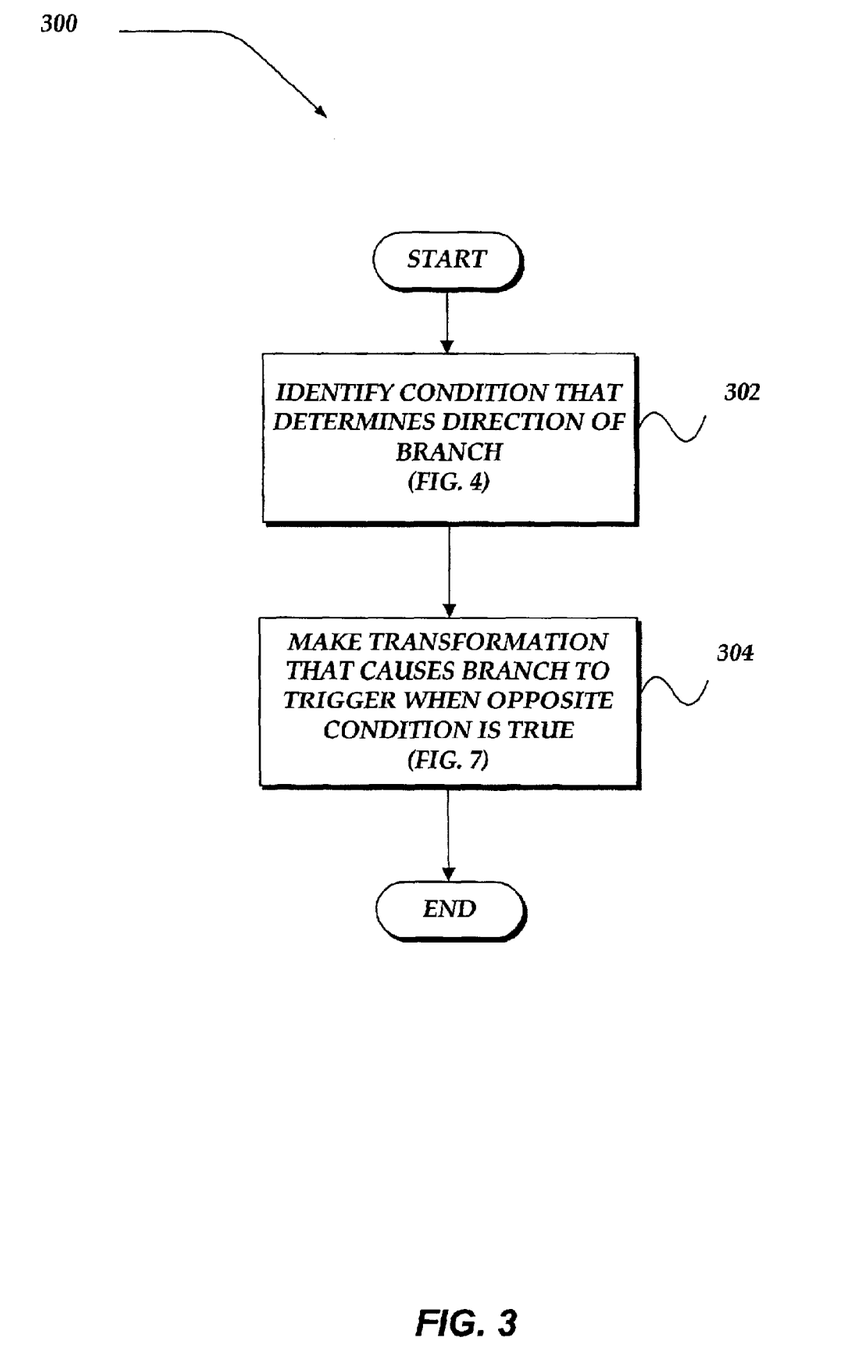
FIG. 3 illustrates a flow diagram generally showing one embodiment of a process of branch reversals.

FIG. 3 illustrates a flow diagram generally showing one embodiment of a process of branch reversals on computer architectures supporting predicated executions, in accordance with the present invention. The branch reverser process 300 begins, after a start block, at block 302.

At block 302, the process performs a predicate aware data flow analysis of a predicated binary level code to identify the conditions that determine the directions of a branch. The particular operations that may be performed at block 302 are illustrated in detail in FIG. 4 and described in the related discussion. The process control continues to block 304.

At block 304, the process employs the output from block 302 (i.e., the identified conditions that determine the conditional branch directions) to make a transformation in the predicated binary level code that causes the conditional branch of interest to trigger, or execute, when an opposite condition is true. The particular operations are illustrated in detail in FIG. 7 and described in the related discussion. Upon completion of block 304, the logical process control flow ends.

Identification of Conditions Influencing the Direction of a Branch

Figure 4:
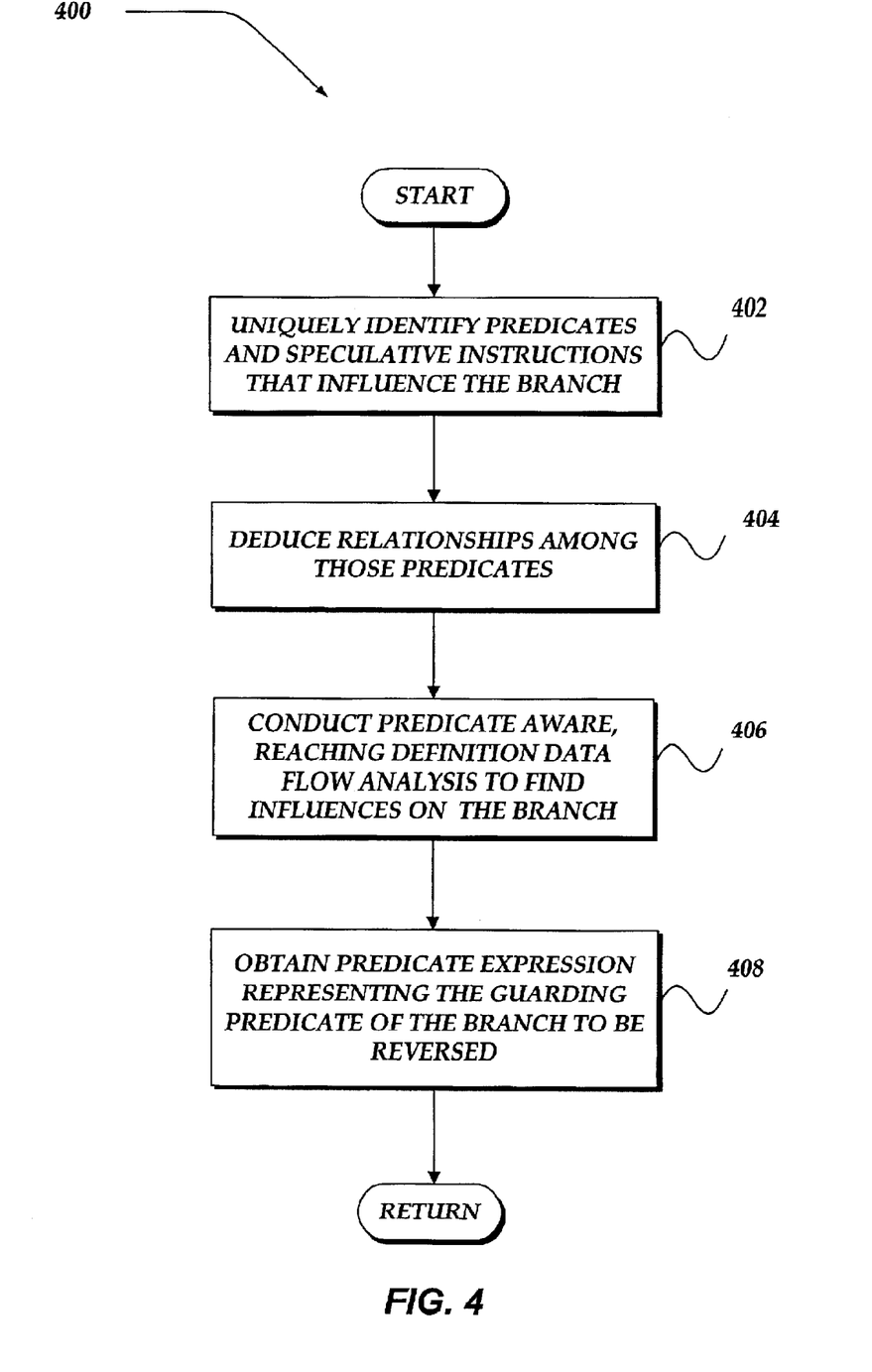
FIG. 4 is a flow diagram illustrating one embodiment of an influencing-conditions process to identify predicate expressions and conditions that influence a direction of a branch to be reversed.

FIG. 4 is a flow diagram illustrating one embodiment of an influencing-conditions process 400 to identify the predicate expressions and conditions that influence the direction of a branch to be reversed, described above at block 302 in FIG. 3, in accordance with the present invention.

As an example for aiding in the understanding of the influencing-conditions process 400, predicated assembly code 206 in FIG. 2 illustrates the following predicated assembly code fragment:

(p1) cmp p3, p4=<condition 1>       (1)

(p2) cmp p5, p3=<condition 2>;;     (2)

(p3) branch <Target 1>;;            (3)

In the above example, the problem is to determine which version of predicate p3 is used by the branch instruction. As shown, if predicate p2 is always true, then the branch depends only upon the second compare instruction, above. If predicate p2 is never true, and predicate p1 is always true, then the branch instruction depends only upon the first comparison. However, if predicates p1 and p2 are sometimes true and sometimes false, then the branch depends upon both of the illustrated compare instructions. Moreover, if there is a condition where both predicates p1 and p2 are false simultaneously, then the branch also depends upon some other compare in the program, which is not shown in the example of assembly code fragment above.

The influencing-conditions process 400 begins, after a start block, at block 402 where the predicate binary level code is configured into an intermediate representation that is amendable to further analysis.

At block 402, each predicate and speculative load instruction of the predicate binary level code is uniquely numbered. In one embodiment of the present invention, each predicate is represented by a new label that is numerically incremented at the occurrence of the same predicate in the predicate binary level code. For example, the above illustrated predicated assembly code fragment may be represented as follows:

(p1) cmp p3.1, p4=<condition 1> (4)

(p2) cmp p5, p3.2=<condition 2>;; (5)

(p3.3) branch <Target 1>;; (6)

where each occurrence of predicate p3 is represented by either predicate p3.1, p3.2, or p3.3. If it is determined that other predicates, such as predicate p1, occurred in the assembly code not shown, then it too would be incremented employing a similar intermediate representation.

Alternative intermediate representations of the predicated assembly code may be employed that provide a unique identification of each predicate and speculative load instruction. For example, Static Single Assignment (SSA) may be employed to generate an intermediate representation of the predicated assembly code, without departing from the spirit or scope of the present invention.

Process control continues to block 404, where relationships between the predicates in the intermediate representation of the predicated assembly are deduced. In one embodiment of the present invention, a predicate partition graph is constructed that illustrates the relationships among the predicates. In a predicate partition graph, each node in the graph represents a predicate and each edge on the graph represents that there exists a partition of the predicate such that a subset exists in the partition. An edge in the predicate partition graph is directed and the edges created from the same partition are given the same label. A predicate partition graph is complete if the universal predicate set, U, is the unique root. This makes every node reachable from the root, as is required in predicate analysis. Although the predicate partition graph precisely represents the predicate relationships, for the same predicate assembly code, alternative predicate partition graphs may be constructed without departing from the scope or spirit of the present invention.

One embodiment of a predicate partition graph for the intermediate representation of the example predicated assembly code fragment, above, is illustrated in FIG. 5. The root of the partition, U, is partitioned into predicate p1 node, and predicate p2 node. Predicate p1 node is partitioned into predicate p3.1 node and predicate p4 node. Further, predicate p2 node is partitioned into predicate p3.2 node and predicate p5 node.

Completion of the predicate partition graph for the entire intermediate representation of the assembly code enables the construction of a global Predicate Query System (PQS) based on the predicate partition graph to support a variety of different queries on the identified predicate relations in subsequent steps of the present invention. Process control flow moves to block 406.

Returning to FIG. 4, at block 406, a predicate-aware, reaching definition data flow analysis is conducted on the intermediate representation of the predicate assembly code. A reaching definition is an analysis that discovers what definitions of a certain object may reach a use of that object. A definition is said to reach a use of an object if it is possible for the value defined at the definition to be intact by the time control proceeds to that use. A given use may have several definitions that reach it; and these definitions are kept in a list, or chain for the use. A traditional reaching definition however does not adequately account for the complexity of data flow with predicated expressions. For example, given the following assembly code fragment, traditional reaching definition analysis, should determine that the branch instruction is reached by the second occurrence of predicate p3 (instruction (8)).

cmp p3, p4=<condition 1> (7)

cmp p5, p3=<condition 2>;; (8)

(p3) branch <Target 1>;; (9)

Once guarding predicates are included on instructions (7) and (8) in the above example assembly code fragment, either both, or neither of the occurrences of predicate p3 could reach the branch. Thus, in one embodiment of the present invention reaching definition data flow analysis is modified to include awareness of the relationships between predicates.

In the predicated assembly code fragment illustrated above (instructions (4)–(6)), one potential solution to the predicate aware, reaching definition data flow analysis may be the following logical expression identifying the relationships between predicates:

p3.3={p1 & p3.1 }||{p2 & p3.2} (10)

denoting that p3.3 is determined by either predicate p1 and p3.1 or by predicates p2 and p3.2.

Process control flow continues to block 408, where for each conditional branch to be reversed in the program a reduced predicate expression that represents the guarding predicates on the branch is obtained from the output of block 406. Analysis of logical expression (10), above enables the creation of a reduced reaching definition as illustrated in FIG. 6. FIG. 6 shows a reaching definition relationship between predicates in the intermediate representation of the example predicated assembly code fragment (instructions (4)–(6)).

One potential output of block 408, for the example predicated assembly code fragment may be the simplified logical expression showing the relationship between predicates p3.1 and p3.2 to predicate p3.3 p3.3={p3.1||p3.2} (11)

After a predicate expression is generated for each conditional branch to be reversed, process 400 returns to block 304 (shown in FIG. 3) to perform other actions.

Transforming Conditions that Trigger a Branch

Figure 7:
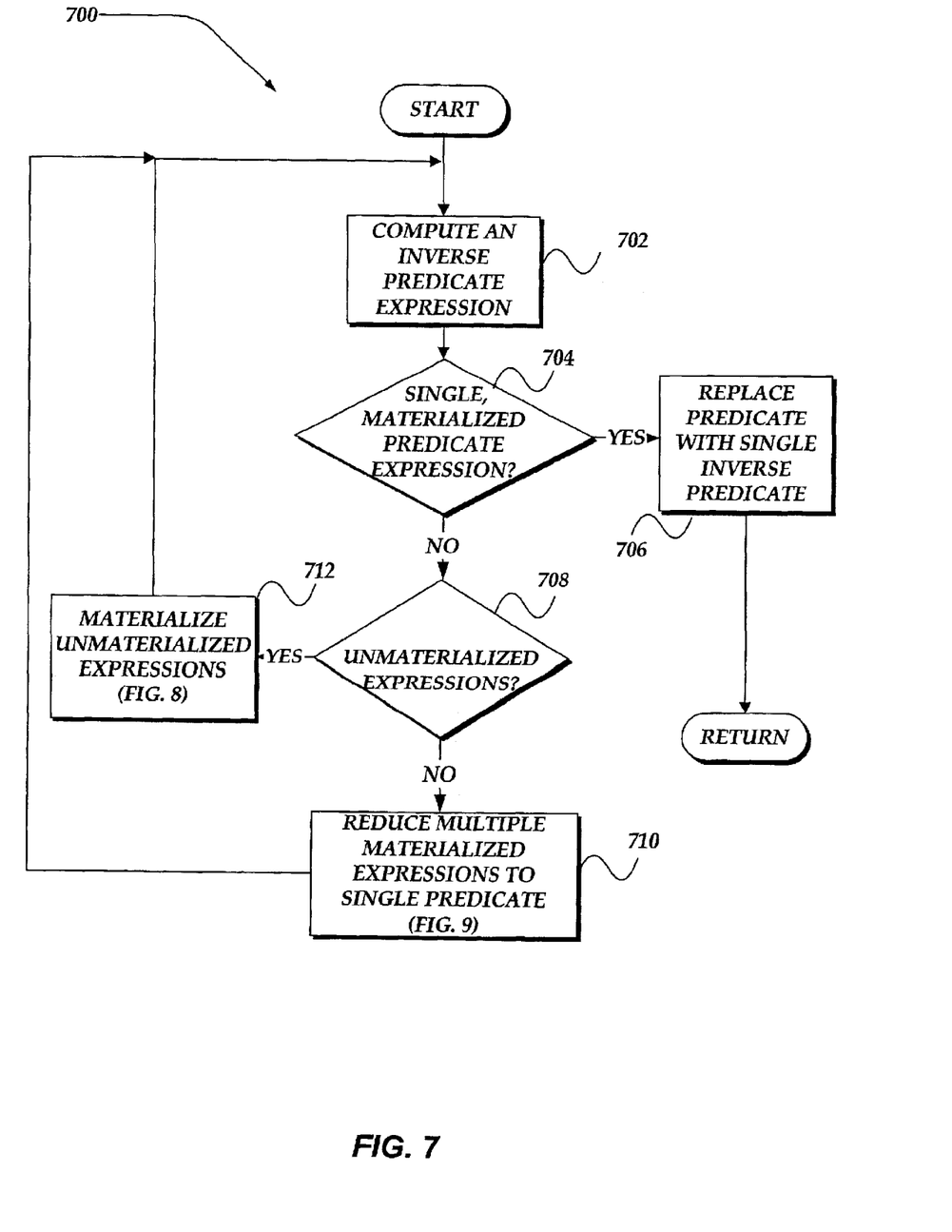
FIG. 7 is a flow diagram illustrating one embodiment for a process of transforming a conditional branch so that it triggers when an exact opposite condition is true.

FIG. 7 is a logical flow diagram generally illustrating one embodiment of a transforming-branch process 700 to transform a branch so that it triggers when an exact opposite condition is true, described above at block 304 in FIG. 3, in accordance with the present invention. Process 700 of FIG. 7 begins, after a start block, at block 702.

At block 702, the Predicate Query System constructed at block 404 in FIG. 4 is employed for each branch to be reversed to compute an inverse predicate expression for the predicate expression generated at block 408, in FIG. 4.

Referring briefly to FIG. 6 as an example, the inverse predicate for predicate p3.1 is predicate p3.2. Process control flow continues to decision block 704.

At decision block 704, it is determined whether the inverse predicate expression generated at block 702 is comprised of a single materialized predicate. A materialized predicate is a predicate that actually appears in the predicate assembly code. For example, in the predicate assembly code instructions (4)–(6), above, predicates p4 and p5 actually appear in predicate assembly code instructions. If it is determined that the predicate expression comprises a single materialized predicate, process control flow proceeds to block 706.

At block 706, the predicate on the branch to be reversed is replaced with the single materialized inverse predicate found at block 702. Additionally, the <Target> of the branch is replaced with the location of the fall-through set of instructions. The original <Target> of the branch is made the new fall-through set of instructions. Process control flow returns to after block 304 (shown in FIG. 3) to perform other actions.

Alternatively, if at decision block 704 it is determined that the inverse predicate expression generated at block 702 is not comprised of a single materialized predicate, process control flow moves to decision block 708.

At decision block 708, it is determined whether the inverse predicate expression is comprised of one or more predicates that do not exist in the program (i.e., are unmaterialized predicates). Unmaterialized predicates may arise where a conditional branch does not include an alternative set of instructions to be executed upon failure of the conditional branch (such as an "if-then" statement without an "else" block).

If it is determined at decision block 708, that at least one unmaterialized predicate exists in the inverse predicate expression, process control flow moves to block 712. Block 712 is illustrated in detail in FIG. 8 and described in the related discussion. Briefly, however, block 712 materializes the unmaterialized predicates in the inverse predicate expression by finding or generating unused predicate registers. Upon materialization of the unmaterialized predicates, process control flow returns to block 702 to continue logical process control flow as described above.

Alternatively, if at decision block 708 it is determined that the inverse predicate expression generated at block 702 includes only materialized predicates, process control flow moves to block 710, where it is recognized that the inverse predicate expression is comprised of multiple materialized predicates.

Figure 9:
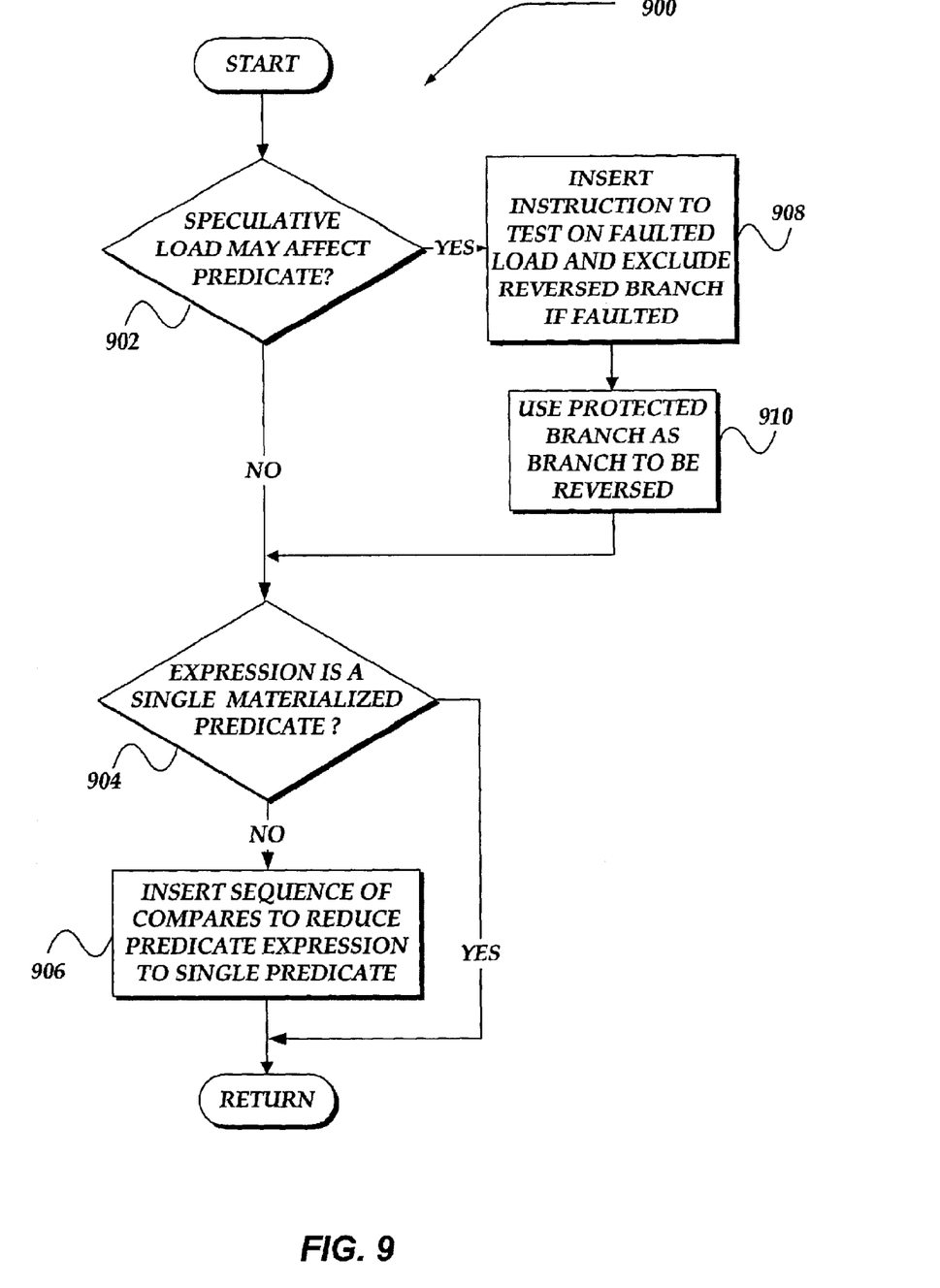
FIG. 9 is a flow diagram illustrating one embodiment for a process of reducing multiple materialized predicates to a single materialized predicate in an inverse predicate expression, in accordance with the present invention.

Block 710 is illustrated in detail in FIG. 9 and described in the related discussion. Briefly, however, at block 710 the multiple materialized predicates that comprise the inverse predicate expression for a given branch is reduced to an expression comprising a single materialized predicate. Upon reducing the multiple materialized predicates to a single materialized predicate, process control flow returns to block 702 to continue logical process control flow as described above.

Materializing Unmaterialized Predicates

Figure 8:
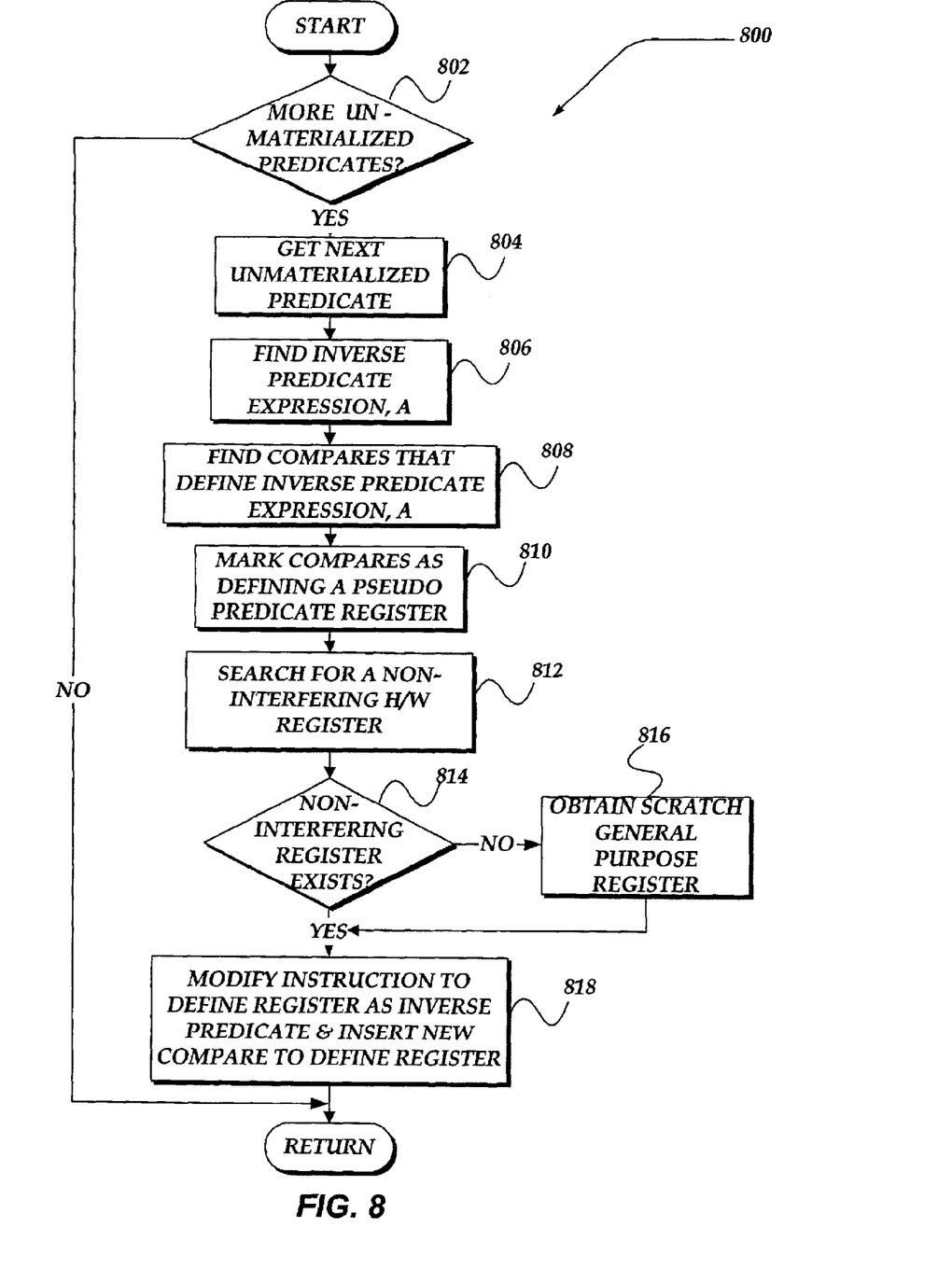
FIG. 8 is a flow diagram illustrating one embodiment for a process of materializing unmaterialized predicates in an inverse predicate expression.

FIG. 8 is a flow diagram illustrating one embodiment of a process of materializing unmaterialized predicates in an inverse predicate expression, described above at block 712 in FIG. 7, in accordance with the present invention. Process 800 of FIG. 8 begins, after a start block, at decision block 802.

At decision block 802, it is determined whether there are any more unmaterialized predicates that need to be materialized. If it is determined that there are no more unmaterialized predicates, process control flow returns to block 712 in FIG. 7 to continue logical process control flow as described above.

Alternatively, if it is determined at decision block 802 that there are more unmaterialized predicates to materialize, process control flow moves to block 804, where the next unmaterialized predicate is obtained for the inverse predicate expression for the branch to be reversed. Process control flow continues to block 806.

At block 806, an inverse predicate expression, A, is determined from the predicate query system (PQS), where inverse predicate expression A is comprised only of materialized predicates. Process control flow moves to block 808.

At block 808, the predicate aware, reaching definition determined above in conjunction with FIG. 4, is employed to determine compare instructions that define the components of the inverse predicate expression A. Process control flow continues to block 810.

At block 810, each compare instruction that is located at block 808 is marked or uniquely tagged as defining a pseudo predicate register P. Additionally, each branch instruction to be reversed is marked as employing pseudo predicate register P, rather than the unmaterialized predicate. Process control flow proceeds to block 812.

At block 812, a search is conducted for each pseudo predicate register P, to determine if there exists a hardware predicate register that does not interfere with pseudo predicate register P. In one embodiment of the present invention, the search results are determined by conducting a predicate-aware liveness analysis to construct a predicate-aware interference graph. A predicate, or any variable in a program, is live at an entry of a block of instructions if there is a direct reference of the variable or predicate in that block of instructions or at some point reachable from that block not preceded by a definition. Two live ranges interfere with each other if an allocation to the same predicate's register changes the meaning of the program. Alternatively, two live ranges for predicates are said to interfere with each other, if one of them is live at the definition point of the other. Process control flow proceeds to decision block 814.

At decision block 814, it is determined whether, based on the interference analysis at block 812, for each pseudo predicate register P there exists a hardware predicate register that does not interfere with the live range of pseudo predicate register P.

If it is determined at decision block 814 that for some pseudo predicate register P there does not exist a non-interfering hardware predicate register, then a general purpose scratch register is obtained. The general purpose scratch register is employed to save and restore predicate registers, thus breaking the interference and freeing a predicate register for pseudo predicate register P. Conditions may arise where no general-purpose scratch register is available. Where no general purpose scratch register is available, a cost decision is made to not reverse the affected conditional branch. However, if a general-purpose scratch register is located, process control flow moves to block 818.

Alternatively, at decision block 814 it is determined that there is a non-interfering hardware predicate register, process control flow proceeds to block 818.

At block 818, each compare instruction located at block 808 is modified to define pseudo predicate register P as the inverse predicate. There may be compare instructions where there is no placeholder or available location to insert pseudo predicate register P. In such situations, one embodiment of the present invention, based on a cost decision, determines whether it is reasonable to continue to attempt to reverse the conditional branch. If it is determined that the cost is too high to continue to attempt to reverse the conditional branch the branch is skipped and left in its original configuration. Alternatively, if it is determined to continue to attempt to reverse the conditional branch then immediately after the located compare instruction, a new compare instruction is inserted that defines pseudo predicate register P.

By way of illustration, suppose that in the following compare instruction predicate p0 is unavailable as a placeholder, and the inverse of predicate p1 is sought:

$$\text{cmp p1, p0=<condition>;;} \tag{12}$$

The present invention inserts after the above example compare instruction the following such that predicate p2 is associated with pseudo predicate register P and is the inverse of predicate p1:

$$\begin{aligned}&\text{p2=cmp 1, 1;; to set predicate p2 to true}\\&\text{(p1) p2=cmp 1, 0;; predicate p2 is set to false if predicate p1 is true}\end{aligned} \tag{13}$$

After block 818, if it is determined to continue to reverse the conditional branch, process control flow returns block 702 in FIG. 7 to continue logical process control flow as described above.

Reducing Multiple Materialized Predicates

FIG. 9 is a flow diagram illustrating one embodiment of a process of reducing multiple materialized predicates to a single materialized predicate in an inverse predicate expression, described above at block 710 in FIG. 7, in accordance with the present invention. Process 900 of FIG. 9 begins, after a start block, at decision block 902.

At decision block 902, it is determined whether any speculative load computations reach the compare instructions producing any of the multiple materialized predicates. Speculative loading of instructions requires special attention because they typically employ a special hardware bit that may impact the truth-value of a predicate during a faulted speculative load. In one embodiment of the invention, based on a cost to continue, a conditional branch that is affected by speculative loading of instructions is not reversed. That is, the process would terminate and the branch that is affected by speculative loads would not be reversed.

In another embodiment of the present invention, as illustrated in FIG. 9, the process attempts to exclude execution of reversed branches with faulted speculative loads. Thus, in FIG. 9, if it is determined at decision block 902, that a speculative load instruction affects the materialized predicates for the branch to be reversed, process control flow proceeds to block 908.

At block 908, a scratch predicate register is obtained, as described above, and a test instruction for a faulted speculative load is inserted before the conditional branch to be reversed. A new copy of the branch instruction is created called C. Yet, another branch instruction is created and inserted immediately after the test instruction for faulted speculative loads. This new second branch instruction is enabled to branch to instruction C if the result of the test instruction indicates no faulted speculative load is present. Process control flow proceeds to block 910.

At block 910, instruction C is set to the branch instruction that is to be reversed. Because of the test instruction that was inserted during block 908, instruction C is free of the special hardware bit that arises from faulted speculative loads. Process proceeds to decision block 904.

At decision block 902, alternatively, if it is determined that no speculative load instruction affects the materialized predicates for the branch to be reversed, process control flow proceeds to decision block 904.

At decision block 904, it is determined if the predicate expression is comprised of a single materialized predicate or multiple materialized predicates. If it is determined that the predicate expression is comprised of a single materialized predicate, process control flow moves to after block 710 in FIG. 7 to continue logical process control flow as described above.

Alternatively, if it is determined at decision block 904 that the predicate expression includes multiple materialized predicates, process control flow proceeds to block 906.

At block 906, immediately before the branch instruction to be reversed, a sequence of compare instructions are inserted that reduce the predicate expression's truth-value to a value of a single materialized predicate register. For example, given that the predicate expression includes predicates p4 and p5, the following sequence of instructions could be inserted:

$$\text{p6=.false.;;} \tag{14}$$

$$\text{(p4) p6=.true.;;} \tag{15}$$

$$\text{(p5) p6=.true.;;} \tag{16}$$

where predicate p6 is determined to be a free register. Predicate p6 would then be available for use on the branch instruction. Process control flow moves to after block 710 in FIG. 7 to continue logical process control flow as described above.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer implemented method for producing a binary-level conditional branch reversal within a binary program on a computer architecture that supports a predicated execution, comprising:

employing runtime data that has been collected on a compiler to determine a binary-level conditional branch to be reversed;

obtaining a predicate expression representing a condition that influences a direction of program flow of the binary-level conditional branch to be reversed;

determining a binary-level transformation based on the predicate expression that causes the binary-level conditional branch to be triggered when an opposite condition is true; and applying the determined binary-level transformation to reverse the binary-level conditional branch.

2. The computer-implemented method of claim 1, wherein obtaining the predicate expression comprises:

uniquely identifying predicates that influence the direction of program flow of the binary-level conditional branch to be reversed;

deducing relationships between the uniquely identified predicates; and based on the relationships between the uniquely identified predicates, determining at least one predicate that influences the direction of program flow of the binary-level conditional branch.

3. The computer-implemented method of claim 2, further comprising locating speculative load instructions that impacts the truth value of a predicate associated with the binary-level conditional branch.

4. The computer-implemented method of claim 3, further comprising inserting into the binary program instructions to exclude execution of the binary-level conditional branch in response to a faulted speculative load.

5. The computer-implemented method of claim 2, wherein deducing the relationships includes conducting a predicate-aware, reaching definition data flow analysis.

6. The computer implemented method of claim 1, wherein determining the binary-level transformation comprises computing an inverse predicate expression that describes the opposite condition.

7. The computer implemented method of claim 6, further comprising determining whether at least one predicate in the inverse predicate expression is unmaterialized, and, if so, materializing the unmaterialized predicate.

8. The computer implemented method of claim 7, wherein materializing the unmaterialized predicate comprises:

locating a free register to support the unmaterialized predicate;

associating a new predicate with the free register; and adding an instruction to define the new predicate as the unmaterialized predicate, wherein the unmaterialized predicate is now materialized.

9. The computer implemented method of claim 8, wherein locating the free register comprises conducting a predicate-aware liveness analysis.

10. The computer implemented method of claim 6, wherein if the inverse predicate expression includes multiple predicates, reducing the inverse predicate expression to a single predicate.

11. The computer implemented method of claim 10, wherein modifying the binary-level conditional branch comprises replacing an existing guarding predicate with the single predicate.

12. A computer-readable medium having computer-executable instructions for producing a binary-level conditional branch reversal within a binary program on a computer architecture that supports a predicated execution, the instructions comprising:

employing runtime data that has been collected on a compiler to determine a binary-level conditional branch to be reversed;

obtaining a predicate expression representing a condition that influences a direction of program flow of the binary-level conditional branch to be reversed;

determining a binary-level transformation based on the predicate expression that causes the binary-level conditional branch to be triggered when an opposite condition is true; and conditional applying the determined binary-level transformation to reverse the binary-level conditional branch.

* * * * *